(12) United States Patent
Steels

(10) Patent No.: US 6,247,002 B1
(45) Date of Patent: Jun. 12, 2001

(54) METHOD AND APPARATUS FOR EXTRACTING FEATURES CHARACTERIZING OBJECTS, AND USE THEREOF

(75) Inventor: Luc Steels, Paris (FR)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/117,824

(22) PCT Filed: Dec. 11, 1997

(86) PCT No.: PCT/EP97/06974

§ 371 Date: Aug. 7, 1998

§ 102(e) Date: Aug. 7, 1998

(87) PCT Pub. No.: WO98/26368

PCT Pub. Date: Jun. 18, 1998

(30) Foreign Application Priority Data

Dec. 11, 1996 (EP) .................................................. 96402700

(51) Int. Cl.[7] .................................................. G06E 1/00

(52) U.S. Cl. .................................. 706/20; 706/48; 706/52

(58) Field of Search .................................. 706/20, 61, 16, 706/48, 52

(56) References Cited

U.S. PATENT DOCUMENTS

| | | | | |
|---|---|---|---|---|
| 4,803,736 | * | 2/1989 | Grossberg et al. | 382/173 |
| 5,252,268 | * | 10/1993 | Colley et al. | 382/156 |
| 5,274,714 | * | 12/1993 | Hutcheson et al. | 382/157 |
| 5,278,911 | * | 1/1994 | Bickerton | 704/232 |
| 5,467,405 | * | 11/1995 | Raterman et al. | 382/135 |
| 5,588,091 | * | 12/1996 | Alkon et al. | 706/31 |
| 5,687,286 | * | 11/1997 | Bar-Yam | 704/232 |
| 5,727,199 | * | 3/1998 | Chen et al. | 707/6 |
| 5,729,662 | * | 10/1998 | Rozmus | 706/20 |
| 5,822,742 | * | 10/1998 | Rozmus | 706/31 |
| 5,892,838 | * | 4/1999 | Brady | 382/115 |
| 6,151,592 | * | 10/1998 | Inazumi | 706/16 |

OTHER PUBLICATIONS

Shahrestani et al., "Adaptive Recognition by Specialized Grouping of Classes," Proceedings of the Fourth IEEE Conference on Control Applications, 1995, pp. 637–642, Sep. 1995.*

Hong, "Use of Contextual Inforamtion for Feature Ranking and Discretization," IEEE Transactions on Knowledge and Data Engineering, vol. 9, No. 5, pp. 718–730, Oct. 1997.*

Safavian et al., "A Survey of Decision Tree Classifier Methodology," IEEE Transactions on Systems, Man, and Cybernetics, vol. 21, No. 3, pp. 660–674, Jun. 1991.*

(List continued on next page.)

*Primary Examiner*—Mark R. Powell
*Assistant Examiner*—Anil Khatri
(74) *Attorney, Agent, or Firm*—Frommer Lawrence & Haug, LLP; William S. Frommer; Glenn F. Savit

(57) ABSTRACT

A method of extracting features characterising objects consists in discriminating an object from a context, the discriminating step comprising, determining the context consisting of at least two objects, choosing a topic object from the context, deriving feature sets of the topic object and the other objects in the context, judging whether there is at least one distinctive feature set in the feature sets, deriving a new feature set if there is not a distinctive feature set amongst the feature sets, and registering one of the distinctive feature sets as an outcome; and restarting the discriminating step when there exists an object which is not discriminated from the other objects. This method represents a selectionist approach to the characterisation of objects, driven by a discrimination task. There is also an apparatus putting this method into practice and a system for autonomous development of a common vocabulary by a plurality of agents incorporating the method and/or apparatus.

26 Claims, 8 Drawing Sheets

OTHER PUBLICATIONS

Laird et al., "Automated Feature Extraction for Supervised Learning," Proceedings of the First IEEE Conference on Evolutionary Computation, 1994, IEEE World Congress on Computational Ingelligence, vol. 2, pp. 674–679, Sep. 1995.*

Wilkinson et al, "Using the cosine measure in a neural network for document retrieval", ACM pp 202–210, Jan. 1991.*

Kamimura, "Application of the recurrent neural network to the problem of language acquisition", ACM pp 14–28, May 1991.*

Jin et al, "Neural network based decision support for incomplete database systems", ACM pp 62–75, Jan. 1991.*

Pernus F., et al., "Two–Dimensional Object Recognition Using Multiresolution Non–Information–Preserving Shape Features" Pattern Recognition Letters, vol. 15, No. 11, Nov. 1994, pp. 1071–1079.

Ku, K. M., et al., "Robust Coefficient Selection for Recognition of Complex Chinese Characters", Proceedings of the Midwest Symposium on circuits and systems, Lafayette, Aug. 3–5, 1994, vol. 2, No. Symp. 37, Aug. 3, 1993, pp. 1412–1415.

* cited by examiner

METHOD AND APPARATUS FOR EXTRACTING FEATURES CHARACTERIZING OBJECTS, AND USE THEREOF

BACKGROUND OF THE INVENTION

1. Field of the Invention

The present invention relates to the categorisation or characterisation performed by an agent (typically a robot or computer system) on the basis of perceived properties or qualities and, notably, the invention relates to the extraction of features characterising objects. The invention also concerns a system for autonomous generation of a communications protocol, using this feature extraction technique.

The present invention consists in a mechanism for the automatic and spontaneous formation of "meanings", "descriptions" or "categories", which are perceptually grounded, under selectionist pressure arising from a discrimination task. The established "descriptions" can be used for a number of purposes, including communication.

2. Description of the Related Art

A discrimination task demands the ability to distinguish one entity (such as an object), which constitutes the topic, from a series of other entities, which constitute the context. Discrimination takes the form of determining a description of the topic which distinguishes it from the context. The description of the topic will involve the identification of a combination of "categories" or "features" which apply to the topic but not to the entities making up the context. The present invention provides a mechanism for constructing a distinctive feature set from data points representative of an entity, which mechanism autonomously develops the required "categories" or "features".

The invention has arisen in the context of a larger research program to understand the origins of language and meaning using complex systems mechanisms such as self-organisation, co-evolution and level formation (see "Synthesising the origins of language and meaning using co-evolution and self-organisation" by L. Steels in "Evolution of Human Language" edited by J. Hurford, Edinburgh University Press, Edinburgh, 1996c).

The invention concerns the "meaning creation" process, that is, the technique whereby the agent derives characterisation rules and/or information. A method and apparatus are proposed whereby an autonomous agent may originate new meanings. The agent is autonomous in the sense that its ontology is not explicitly put in by a designer, nor is there any explicit instruction.

For the purposes of the present document, meaning is defined as a conceptualisation or categorisation of reality which is relevant from the viewpoint of the agent. Meanings or categories can be expressed through language, although they need not be.

In very general terms, meaning takes many forms depending on the context and nature of the situation concerned. Some meanings (such as colours) are perceptually grounded. Others (such as social hierarchies) are grounded in social relations. Still others (such as goals or intentions for actions) are grounded in the behavioural interaction between the agent and the environment. The present invention focuses on perceptually grounded meanings, although the proposed mechanism could also be used for other domains.

The proposed method and apparatus may be employed in a wide variety of different applications where agents (e.g. software agents or robotic agents) autonomously have to make sense of their environment. This ability is especially important in the case of devices, such as unmanned exploration vehicles, which are required to navigate and perform tasks in, and/or gather data concerning, a little-known and/or hostile environment.

In a more general way, the present invention may be applied with advantage in numerous other fields where it is necessary to be able to characterise entities, for example, natural language processing systems, character or voice recognition systems, expert problem solving systems, systems indexing objects based on images (whether for creation of an index for a database of the images or for operational purposes, such as, the detection of cracks in an imaged structure), etc.

The present invention concerns both "meaning creation" in a single agent, and "meaning creation" in multiple agents which communicate with one another using the categories that they have developed. In the latter case, a common communications protocol or "language" can be built up and can act as a way to achieve a coherent conceptual framework between agents even though every agent individually builds up its own repertoire.

There is no suggestion that the method according to the present invention corresponds empirically to any processes performed in the animal or human mind. This method does, however, enable artificial devices to create meaningful characterisation information in a wide variety of applications.

There has been a lot of work on the problem of meaning creation particularly in the connectionist literature (see, for example, "Explorations in Parallel Distributed Processing" edited by J. L. McClelland and D. E. Rumelhart, MIT Press/Bradford Books, Cambridge, Massachusetts, 1986). A perceptron, for example, can be seen as a device that acquires a set of distinctions as relevant for a classification task. The sensory channels are constituted by the inputs to the perceptron, and the weights perform the function of selecting out regions which will be input for the classification process.

The most important difference between these connectionist approaches and the present invention is that:

(1) connectionist networks embed the build-up of a feature repertoire within the task of classification (as opposed to discrimination), and (2) an inductive/instructional approach as opposed to a selectionist approach is used.

An inductive approach is based on going through a (typically large) set of examples which drives the weights stepwise to reflect the best classification. In a selectionist approach, a structure comes into existence by variation or construction and is then tested as a whole for fitness in the environment. Inductive approaches result in gradual generalisation. Selectionism immediately gives generalisations which might be refined more gradually.

The selectionist approach followed in the present invention is more in tune with work on feature generation in genetic algorithms research (see, for example, "Genetic Programming" by J. Koza, MIT Press, Cambridge, Mass., 1992), unsupervised learning as exemplified by the Kohonen network (see "Self-Organization and Associative Memory" by T. Kohonen, Springer Series in Information Sciences, vol.8, Springer Verlag, Berlin), and proposals, known as "Neural Darwinism", made by Edelman (see "Neural Darwinism: The Theory of Neural Group Selection" by G. M. Edelman, Basic Books, New York, 1987).

Edelman assumes that neuronal growth processes yield a primary repertoire stabilised by developmental selection, which is then subjected to experiential selection, yielding a secondary repertoire of categories. Using re-entrant maps and degeneracy, categorial perceptions of different objects can be compared and generalised to classes. Meaning creation and classification are clearly distinct here. The selectionist pressure in the case considered by Edelman comes from statistical signal correlations (for the formation of classes). By way of contrast, in the present invention, the selectionist pressure comes from a discrimination task.

In summary, the primary disadvantages of the prior art techniques consist in the fact that the categories are supplied by the designer, the categories are not based upon perception, a series of examples is needed in order to "train" the system, there are distinct "training" and "use" phases such that new categories cannot be developed outside the "training" phase, and the data channels are fixed.

SUMMARY OF THE INVENTION

The present invention provides a method and apparatus for extracting features of entities, particularly objects, avoiding the above-mentioned disadvantages of the prior art. The present invention provides, in addition, a technique for autonomous development of a communications protocol or language, using the feature extraction method.

Considering, first, the invention in general terms, it should be noted that agents engage in tasks relevant for their survival in a specific environment. Here, the focus is on perceptually grounded discrimination tasks. The agent attempts to distinguish one object or situation from others using information provided via a number of data channels which are either directly coupled to the output of sensors, or contain the result of processing (for example, based on calculating properties of an image area, the raw image data being provided by a camera or the like), or receiving data from any other data source. In the case where a data channel contains the result of signal or data processing, this is preferably low level processing in order to minimise the time taken and to enable real-time processing.

On the basis of the information provided via the data channels, an agent seeks to autonomously develop a repertoire of features which will enable it to succeed in discrimination of the different objects or situations in its field of attention, and to adapt this repertoire when new objects or situations are considered. A specific attempt to perform a discrimination and the subsequent adaptation of the feature repertoire is referred to below as a "discrimination game".

Let us assume that there is a set of objects, or more generally situations, which have characteristics that are sensed so as to generate data on the data channels, derived either directly from sensors or from low level processing routines as mentioned above. A data channel preferably is adapted to yield a value between −1.0 and +1.0. Typically, this desired range of values is obtained by normalisation with reference to the maximum range of values derived for the channel in question. As an example, the data channels could relate to properties of moving objects like size, speed, average grey area, etc., or, in a more general case, internal states reflecting motivations, sensations or actuator streams. The majority of the preceding examples concern data channels in which the range of values is continuous. However, the present invention can also use data channels which yield discrete data points, for example, a data channel indicating the number of bright spots observed on an object.

Below, the meaning creation process is first explained abstractly without reference to specific applications. However, laboratory experiments with real mobile robots, speech, and active vision yield a sensory basis for the mechanisms proposed here.

According to the present invention, a meaningful distinction takes the form of a "feature", which decomposes into an attribute and a value. For example, the attribute could represent "the data point observed by the agent in data channel sc-7", and the value could represent "between 0.00 and 0.05". An alternative manner of representation of the same characteristic of the object could consist in the definition of an attribute of the following kind "the location of the data point observed by the agent within the range 0.00 to 1.00 of data channel sc-7" and the value could represent "in the first half of the range". Obviously, the attribute and the value will usually be represented by codes instead of the corresponding semantic expressions (which are given above merely for the purpose of ease of understanding). An object can be described or characterised by indicating one or more such features which apply to it. This description will be distinctive if it cannot be applied to other objects in the field of attention of the agent.

The feature is derived by a "feature detector" operating on a particular data channel and having an associated "attribute name". In preferred embodiments of the invention, the feature detector contains internally a "discrimination tree" which ascribes, to some subranges of the overall range of data points observable on the data channel, a respective associated value. A data point observed for a particular object in a data channel is classified, by the feature detector associated with this channel, as falling within a particular subrange and, thus, a corresponding feature (attribute+value) is ascribed to the object, see FIG. 1. In particularly preferred embodiments of the invention, the discrimination tree associated with a particular feature detector can be "refined" by further sub-dividing subranges of the overall range of data points, a value $v_1$ being a refinement of another value $v_2$ if the range of $v_1$ is a subrange of the value $v_2$.

The feature detectors refine discrimination trees in a hierarchical fashion as needed in response to the discrimination task. First of all there is a one-to-one relationship between feature detectors and data channels. Then, since it is generally not sufficient merely to specify that an object gives rise to some data point in a particular data channel, the feature detector divides up the space into some regions (in the examples given in the following description, always two regions which taken together totally occupy the divided range, however other sub-divisions are also suitable). Each of these regions in its turn might then later be segmented by the feature detector if data points observed for objects that need to be discriminated fall within the same region. Thus feature-detectors form natural hierarchies, which go as deep as required (see FIG. 2 which illustrates an example of a partially-developed discrimination tree for a data channel sc-1 positions in the tree are expressed in terms of attributes and values in two different ways in FIGS. 2a) and b), the expressions of FIG. 2b) being more compact).

There are absolute features, such as '(colour red)', which are based on absolute values of a data channel for a single object, and relative meanings, such as '(speed faster)', which compare states of data channels for different objects. The present discussion only focuses on absolute features but it is to be understood that the techniques of the present invention apply also to the treatment of relative meanings. A particular attribute is not necessarily relevant for each object, in other words, for certain data channels no data points at all may be generated for a particular object.

The present invention makes use of the hypothesis that "meanings" can be based on construction and selection processes embedded in discrimination tasks. Each individual agent is capable of constructing new features, i.e. new segmentations of the data-point space. The process of generating diversity and variation is subjected to selection pressure coming from the discrimination task: The agent attempts to differentiate an object from a set of other objects, which constitute the context, based on the available repertoire of features and values.

In preferred embodiments of the invention, a "feature table" is dynamically built up as the search for a distinctive description proceeds. The feature table contains, for every object under consideration (the topic as well as the other objects in the context) the list of values for each attribute (and thus for each data channel). In a case where the values applicable to a particular data channel have been refined by the associated feature detector, the feature table includes for each object a list of the various values which apply to the data channel, ordered based on the refinement relation. When there is no data on a channel for the object in question then the feature table lists the value NIL. The construction of the feature table starts with the most general values and progressive refinements are added as needed.

Discrimination is the process of distinguishing one object from the others by comparing the sets of features which characterise the different objects. In general, the "description" which distinguishes the object of interest from the others will be based on one or more features grouped as a "distinctive feature set" (see FIG. 3). It may be considered that the distinctive feature set is an unambiguous description of the object in question, applicable to no other object in the field of attention of the agent. There may be more than one possible distinctive feature set, but also none if not enough features are available. This happens either because no feature could be found to characterise the topic, or the available features do not make a sufficiently fine-grained distinction. When there is no distinctive feature set, the discrimination fails and there is pressure on the agent to construct new feature detectors or to refine the features detectable by a given feature detector.

In the preferred embodiments of the invention a "distinction table" is built up based on the content of the feature table. This table is constructed by examining whether a logical combination of features is enough to distinguish the topic from the objects in the context, i.e. whether there is a description which is true for the topic but not for any other object. When no such description is found the following courses of action are preferably taken:

1. An attempt is made to expand the feature table by refining the different values. If an expansion is possible, the feature table is re-examined to see whether a distinctive description can be extracted.
2. The feature table can no longer be expanded. In this case, the discrimination task ends in failure but the discrimination trees are expanded as explained below.

If more than one distinctive description is found then a selection is made, as explained further below. It is advantageous that a record be kept of the frequency of use of each feature in the construction of a distinctive description.

The present invention presents numerous advantages. In contrast with most other concept acquisition approaches (including neural network methods such as error back propagation or case-based reasoning), which assume an inductive process in which there is a progressive generalisation from a series of examples, the invention implies a selectionist approach in which features are constructed by a guided random process and then selected based on their success in discrimination. The category formation process therefore proceeds in a top-down fashion and most general categories are formed first. This leads much more quickly to a repertoire of categories adequate for dealing with the cases seem so far. Categories are refined when they need to be. Also, there is no separation between training and use phases of operation and no prior categorisation by a designer.

Furthermore, the present invention is capable of dealing with an open-ended set of data channels and an open-ended set of cases. At any time new data channels can be added, in which case a new feature detector is created and gradually its discrimination tree will be built up as needed, driven by the discrimination task. At any time there may come into the field of attention of the agent a new case which requires refinement of one of the nodes in a discrimination tree.

Moreover, different kinds of additional selectionist criteria can be introduced into the present invention. For example, if the apparatus is coupled to a lexicon-formation process adapted to express the distinctive description of an object using words, then the availability within the lexicon of words to express the features involved in the distinctive description may act as an additional selectionist criterion useful for choosing between different possible distinctive descriptions. Similarly, a choice between different possible distinctive descriptions can be based on the frequency of use of the component features making up the description.

BRIEF DESCRIPTION OF THE DRAWINGS

Further features and advantages of the present invention will become apparent from the description below given in association with the accompanying drawings, in which.

DETAILED DESCRIPTION OF PREFERRED EMBODIMENTS

Figure 1:
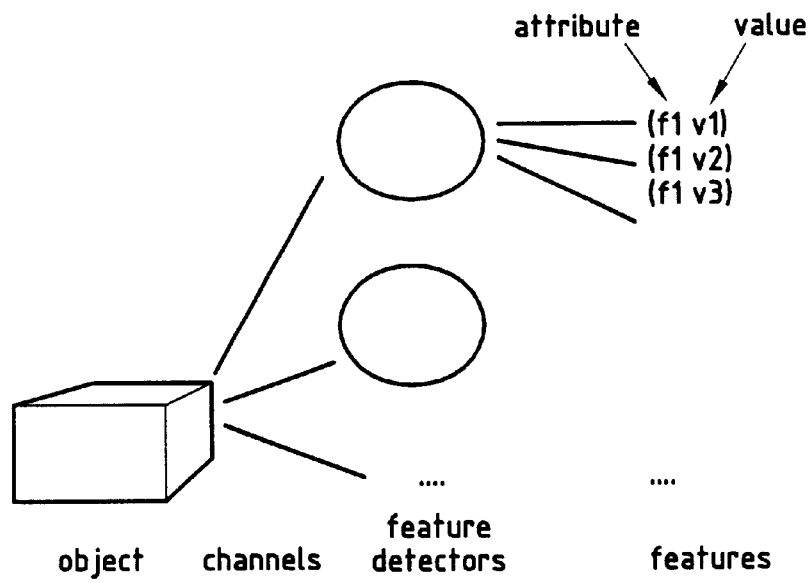
FIG. 1 is a diagram illustrating the feature perception process.
Figure 3:
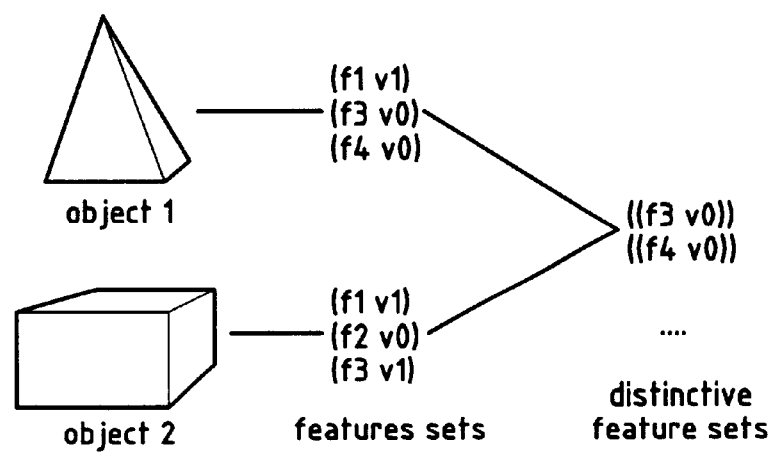
FIG. 3 is a diagram illustrating the process of discrimination.
Figure 2A:
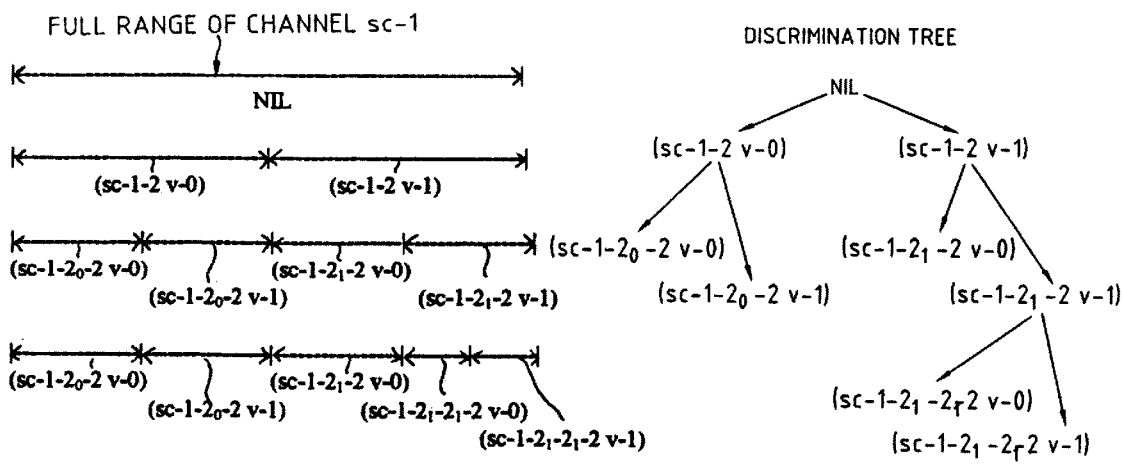
FIG. 2 is a diagram illustrating how feature detectors grow as needed by the task domain.
Figure 2B:
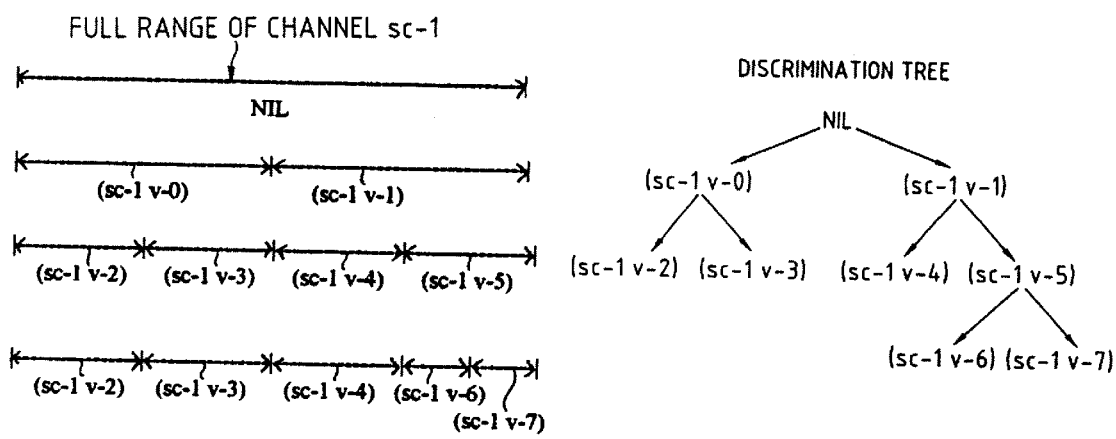

Embodiments of the present invention can take many forms, both in computer software and in hardware implementations. It can be integrated into robotic agents that autonomously need to categorise situations, into natural language processing systems that need autonomously to build up categories and language they use for communicating with other human or artificial agents, etc.

Below, after a formal presentation of the method of the present invention using mathematical terminology (especially set notation), the method will be illustrated by discussion of results of a simulation. Next, a preferred embodiment of apparatus for putting the method into practice will be described. Then some experimental results are reported. The final section of the description contains some conclusions.

A formal description of the characterisation process according to the present invention now follows.

TERMINOLOGY

Let there be a set of objects $O=\{o_1, \ldots, o_m\}$ and a set of data channels $S=\{\sigma_1, \ldots, \sigma_n\}$, being real-valued partial functions over O. Each function $\sigma_j$ defines a data point $\sigma_j(o_i)$ for each object $o_i$. The set of data points for a given object $o_i$ is a data sequence $<\sigma_1(o_i), \ldots \sigma_n(o_i)>$. If $\sigma_j(o_i)$ is undefined, for example because there is no information in this data channel for the object in question, it is denoted as NIL. According to the present invention it is preferred that the data points in each data channel should be confined in the range $-1$ to $+1$, that is, $-1.0 \leq \sigma_j(o_i) \leq +1.0$. In general, this can be achieved by normalisation because the range of possible output values of the relevant sensor or processing routine is known. However, it is also possible to accommodate data channels in which the data points are not normalised (for example, because the data channel in question is a new one whose properties are not fully known).

An agent a has a set of feature detectors $D_a=\{d_{a,1}, \ldots, d_{a,m}\}$. A feature detector $d_{a,k}=<p_{a,k}, V_{a,k}, \phi_{a,k}, \sigma_j>$ has an attribute name $p_{a,k}$, a set of possible values $V_{a,k}$, a function or discrimination tree $\phi_{a,k}$, and a data channel $\sigma_j$. In other words, the feature detector $d_{a,k}$ operates on data channel $\sigma_j$ and attempts to ascribe a value $\upsilon$ from the set of possible values $V_{a,k}$ to an attribute $p_{a,k}$ of an object $o_i$, by applying the function or discrimination tree $\phi_{a,k}$ to the data point $\sigma_j(o_i)$ observed for object $o_i$ in the data channel $\sigma_j$. The result of applying a feature detector $d_{a,k}$ to an object $o_i$ is a feature written as a pair $(p_{a,k}\upsilon)$ where p is the attribute name and $\upsilon\phi_{a,k}(\sigma_j(o_i)) \in V_{a,k}$ the value.

In general, it is not meaningful to ascribe a value to the overall range of a data channel, in other words, if all that is known about the data point for an object $o_i$ is that this data point corresponds to some (unspecified) position within the range of the data channel, it is preferable that the feature detector should not ascribe a feature to the object but instead should indicate NIL. Thus, it may be considered that the value corresponding to the top of the discrimination tree for each data channel/feature detector is NIL. Under the pressure of a discrimination task the discrimination trees are developed by refinement (as explained below).

In preferred embodiments of the invention, the discrimination trees $\phi_a$ used by the feature detectors are binary, that is, as they are developed they divide up the total range of a data channel into successively smaller regions based on division of a range or subrange into two equal subregions. However, it is not obligatory that the discrimination trees be binary, instead they could divide a range into n subranges and then each of these subranges into m subranges, etc.

A developed discrimination tree consists of a set of tuples specifying the possible refinements of values $\upsilon_i \in V_{a,k}$ each of these tuples may be expressed as $<\upsilon_{i,1}, r_j, \upsilon_{i,2}, u_j>$, where $\upsilon_{i,1}$ represents the value to be refined, $r_j$ represents the portion of $\upsilon_{i,1}$ which will correspond to the refined value, $\upsilon_{i,2}$ represents the refined value and $u_j$ indicates the number of times to date the feature corresponding to value $\upsilon_{i,1}$ has been used in discrimination. As explained below, the latter parameter is useful when it comes to selecting the optimal distinctive feature set and/or when a decision is required as to how a discrimination tree should be further refined.

The feature set which agent a will produce with respect to an object $o_i$ is defined as $F_{a,oi}=\{(p_{a,k}\upsilon) | d_{a,k} \in D_a, d_{a,k}=<p_{a,k}, V_{a,k}, \phi_{a,k}, \sigma_j>, \upsilon=\phi_{a,k}(\sigma_j(o_i))\}$. In other words, the feature set $F_{a,oi}$ contains the features $(p_{a,k}\upsilon)$ identified for object $o_i$ by application of feature detectors $d_{a,k}$ which are members of the set of feature detectors $D_a$ available to this agent, $d_{a,k}$ and $\upsilon$ being defined as explained above. Two features $(p_{a,1} \upsilon_1)$, $(p_{a,2} \upsilon_2)$ are distinctive if $p_{a,1}=p_{a,2}$ and $\upsilon_1 \neq \upsilon_2$, in other words, two features are distinctive if, for each of the respective features, the agent ascribes a different value to the same attribute.

A distinctive feature set $D_{a,ot}^c$ is a set of features, identified by agent a, distinguishing an object $o_t$ from a set of other objects C. Expressed formally, $D_{a,ot}^c=\{f | f=(p \upsilon) \in F_{a,ot}$, and $\forall o_c \in C$ either $\exists f'=(p'\upsilon') \in F_{a,oc}$ with $p=p'$, or $\exists f' \in F_{a,oc}$ with $\upsilon$ and $\upsilon'$ distinctive$\}$. In other words, the distinctive features f are features which form part of the overall set of features $F_{a,ot}$ identified for object $o_t$ by the agent a and, for all objects $o_c$ which form part of the context C, either the features f' identified for the object $o_c$ relate to attributes different from those of the features f identified for the object $o_t$ or else these features f' relate to the same attribute but have distinctive values from those applicable to the object $o_t$. Clearly, there can be several distinctive feature sets for the same $o_t$ and C, or none.

DISCRIMINATION GAMES

Figure 4:
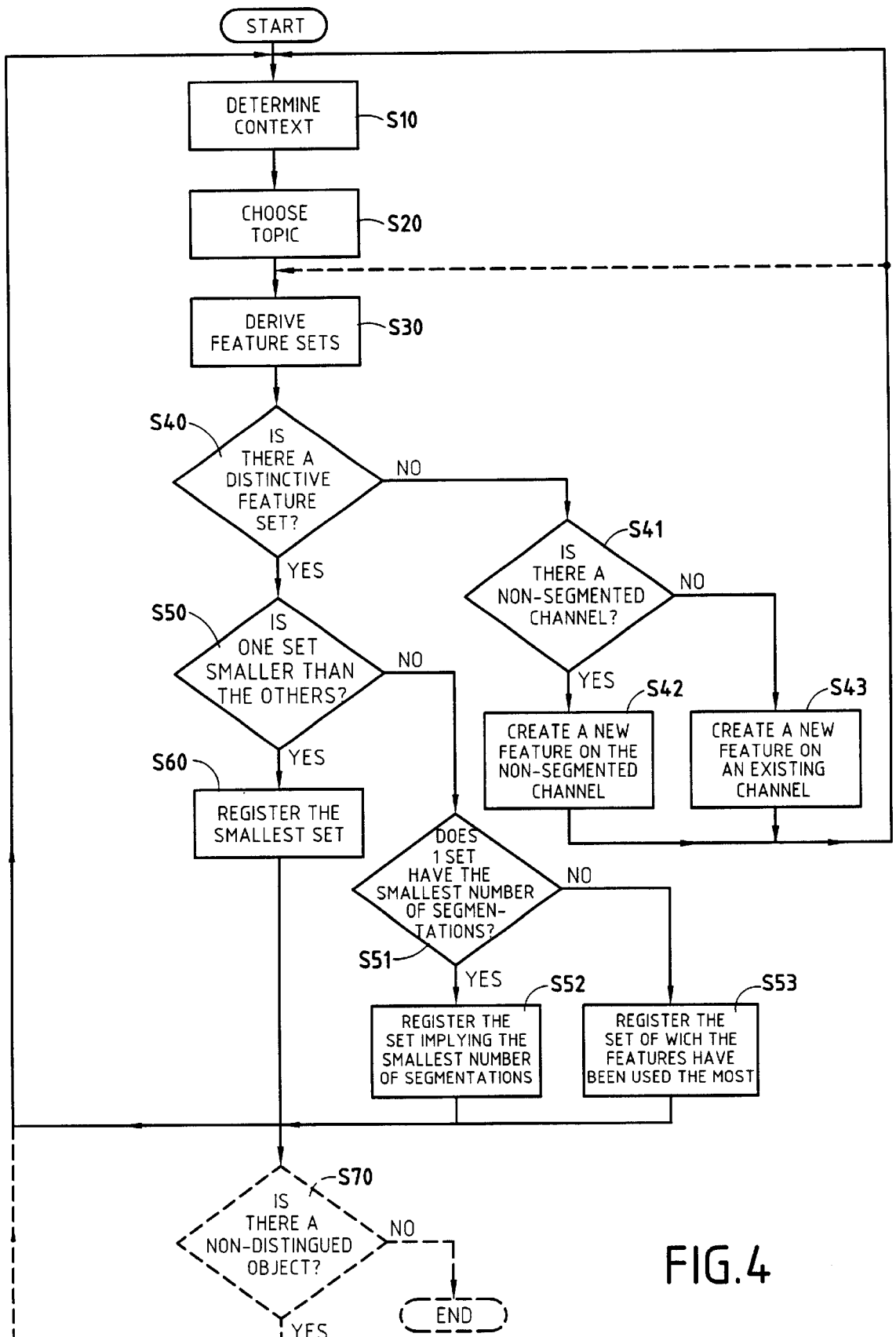
FIG. 4 is a flow diagram illustrating the general steps of a feature extraction method according to a preferred embodiment of the invention.

A preferred embodiment of feature extraction method according to the present invention is illustrated by the flow diagram of FIG. 4. According to this method, an agent a samples information observed on a number of data channels during a certain period of time and, on the basis of this information, makes an attempt to differentiate a topic from its context. It is considered that by this process the agent performs a "discrimination game". In general, regardless of whether or not the first discrimination game ends in success or failure the agent will continue to perform a series of subsequent discrimination games, each respectively involving the information sampled on the data channels in subsequent periods of time. In this way, the agent will continuously be in the process of seeking to discriminate objects from one another and, thus, will continuously develop its repertoire of features as required by the task of discriminating the original objects within its field of attention and any new objects which may enter its field of attention.

In the example illustrated in FIG. 4, the agent makes a determination of the context (step S10) and makes a random selection of an object to serve as the topic (step S20) in each subsequent discrimination game. In this way, any new objects which have come into the field of attention of the agent are taken into account and, also, different objects can be treated as the topic in order to ensure that the agent evenly develops a feature repertoire which is relevant to all of the features in its field of attention. The features characterising the topic and each object in the context are determined (step S30).

A discrimination game d=<a, $o_t$, C> involves an agent a, a topic $o_t \epsilon O$, and a context $C \subset O \cap \{o_t\}$. The outcome of the game is determined by whether or not a distinctive feature set can be found (step S40). Either a distinctive feature set could be found, $D_{a,ot}{}^c \neq \phi$ (that is, the distinctive feature set is not an empty set), and the game ends in success, or no such feature set could be found, $D_{a,ot}{}^c = \phi$, and the game ends in failure.

As part of each game the repertoire of meanings is adjusted in the following way by the agent:

1. $D_{a,ot}{}^c = \phi$, i.e. the game is unsuccessful. This implies that there are not enough distinctions and therefore $\forall o_c \epsilon C$, $F_{a,ot} \subset F_{a,oc}$. In other words, for each object $o_c$ forming part of the context C, the set of features $F_{a,ot}$ identified for the topic $o_t$ is a subset of the features $F_{a,oc}$ identified for that object $o_c$. There are two ways to remedy the situation:
    (a) If there are still sensory channels for which there are no defined features (i.e. the discrimination tree is completely undeveloped), a new feature may be constructed by segmenting the range of the data channel in question. This option is preferred. Thus, in a case where the discrimination game is unsuccessful the flow moves to step S 41, where it is determined whether or not an unsegmented channel exists. If such a channel does exist, then the range is segmented (step S42) so as to define new features corresponding to the divided potions of the range. The discrimination game ends and the flow returns to step S10.
    (b) Otherwise, an existing attribute may be refined by modification of a feature detector so that the discrimination tree further segments the region covered by one of the existing features (step S43). Once again, the discrimination game ends and the flow returns to step S10.

In the case of refinement of an existing attribute, it can be advantageous to refine a data channel in which data is observed for the topic but which has been segmented to only a small degree. This encourages the development of features which are as general as possible. The extension of the discrimination tree will consist in the refinement of a "leaf" which is active (i.e. an end-point, in the branching structure of the tree, to which the data point for the topic has been attributed). The range or subrange identified by this endpoint is then subdivided and new values (features) created for each of the respective divided portions. There is no guarantee that the newly created values will be sufficient for the discrimination task but, later on, refinements that have not been used during a certain number of discrimination games can be eliminated, to optimise storage of the discrimination trees.

When it is decided that refinement of an existing feature is necessary, different approaches are possible. One approach would be to refine the end points of all existing discrimination trees (in other words, to develop one more level in the hierarchy of each discrimination tree) before the subsequent discrimination game. However, it is preferred to refine just a single feature and then to proceed to the next discrimination game, in order to speed up the processing and, thus, to enable real-time processing.

2. $D_{a,ot}{}^c \neq \phi$. In other words, it is determined in step S40 that there is one or more distinctive feature sets. In a case where there is more than one possibility, feature sets are ordered based on preference criteria. The 'best' feature set is chosen and used as the outcome of the discrimination game.

The record of use of the features which form part of the chosen set is augmented. The criteria are as follows:
    (a) The smallest set is preferred. Thus, the least number of features is used to describe the topic. The existence of a "smallest set" is checked in step S50 and, if it exists, it is registered as the chosen distinctive feature step (step S60). Also, it is advantageous to adjust the record of the frequency of usage of the features which form part of the registered distinctive feature set. The present discrimination game ends (i.e. flow returns to step S10).
    (b) In the case of sets of equal size, it is checked whether one of the sets includes features which imply a smaller number of segmentations than in the other sets (step S51). If such a set exists it is registered in step S52. Thus, the most abstract features are chosen. Again, preferably the record of usage of the component features included in the registered distinctive feature set is updated. The present discrimination game ends (i.e. flow returns to step S10).
    (c) In the case of equal depth of segmentation the flow moves to step S53 where the set whose constituent features have been used the most to date is chosen for registration. This ensures that a minimal set of features develops. The present discrimination game ends (i.e. flow returns to step S10).

The whole system is selectionist. Failure to discriminate creates pressure on the agent to create new features. However, the new feature is not guaranteed to do the job. It will be tried (next time) and only thrive in the population of features if it is indeed successful in performing discriminations.

In the example described above, the agent continuously executes a series of discrimination games so as to develop a feature repertoire adapted to discriminate all objects which come into its field of attention. Such an approach is suitable, for example, for implementation by a robot which seeks to navigate in an environment where new objects may be encountered. However, other approaches are possible.

For example, instead of performing an open-ended series of discrimination games in an open environment, the agent may need to perform a discrimination task in a closed system containing a certain number of objects. In such a case, it may be preferable to vary the process illustrated in FIG. 4 as indicated by the items illustrated in dashed lines in the figure. In. particular, the agent systematically treats each object in its field of attention as the topic and, after an unsuccessful discrimination game, creates a new feature or features and performs a new discrimination game for the same definition of topic and context (return to step S30). After a successful discrimination game, the agent checks (in a step S70) whether any objects remain which have not yet been treated as the topic and discriminated from the others. If this determination yields a positive result then the discrimination game is repeated (return to step S10) with this non-discriminated object as the topic, otherwise, the series of discrimination games comes to an end.

Other variations of the basic method may also be adopted depending upon the particular application.

Implementation

A computer simulation was performed to replicate a continuously-run series of discrimination games of the type described above with reference to FIG. 4. The programs created a set of data channels and an initial set of objects which had arbitrary data points for some of the data channels. A typical example is the following list of objects o-0 to o-9 and associated values for the channels sc-0 to sc-9 (in this example, the allowed range for the data points in each channel was 0.00 to +1.00):

o-0: [sc-3:0.73][sc-4:0.82][sc-5:0.07]
o-1 [sc-0:0.89][sc-3:0.02][sc-4:0.56][sc-6:0.48]
o-2 [sc-0:0.74][sc-1:0.92][sc-2:0.22][sc-3:0.56][sc-8:0.52][sc-9:0.03]
o-3 [sc-2:0.36][sc-3:0.09][sc-4:0.14]
o-4 [sc-1:0.47][sc-2:0.61][sc-3:0.69][sc-5:0.67][sc-6:0.14][sc-9:0.43]
o-5 [sc-1:0.84][sc4:0.82][sc-5:0.70][sc-8:0.81]
o-6 [sc-1:0.40][sc-2:0.32][sc-3:0.68][sc-4:0.96][sc-5:0.41][sc-7:0.14][sc-8:0.76]
o-7 [sc-1:0.84][sc-2:0.89][sc-3:0.63][sc-8:0.41]
o-8 [sc-0:0.72][sc-1:0.02][sc-3:0.92][sc-4:0.44][sc-5:0.04][sc-7:0.29]
o-9 [sc-1:0.35][sc-2:0.72][sc-3:0.58][sc-4:0.34]

In this simulation, each feature detector assigned a feature-value to a respective attribute expressed in the form $sc_i$-$n_i$- ... where i is the data channel followed by the number of segments into which the range of each consecutive segment is divided. For example, sc-5-2 is the name of an attribute indicating that the feature detector seeks to identify whether the data point is located within the lower-value or higher-value one of two subregions into which the range of channel sc-5 is divided. (sc-5-2 v-0) is a feature combining the attribute sc-5-2 with the value v-0, the latter value indicating that the data point is located within the lower-value one of the two subregions into which the range of sc-5 is divided (the value v-1 would indicate that the data point falls within the higher-value one of the two subregions in question). sc-5-$2_0$-2 would be the name of an attribute that is a further refinement, indicating that the feature detector now seeks to identify whether the data point is located within the lower-value or higher-value one of two further subranges into which the lower-value subregion (sc-5-2 v-0) is divided.

We now show some typical situations for an agent a-5, which starts from no features at all. In a first game, a-5 tries to differentiate the object o-5 (topic) from o-3 (context). The agent does not yet have a way to characterise the topic and so the discrimination game ends in failure and the agent creates a new attribute for sc-5.

| | |
|---|---|
| a-5: o-5 <-> {o-3} | [Agent a-5 seeks to distinguish o-5 from o-3] |
| Topic: NIL | [No features found for the topic] |
| Not enough features topic | [Deduction] |
| New attribute: sc-5-2 | [Remedy, create attribute sc-5-2] |

The next discrimination game seeks to distinguish o-5 (topic) from o-9 and o-1 (which, jointly, make up the context). This game is successful, because the data point for o-5 in channel sc-5 gives rise to a value v-1 for the attribute sc-5-2, in other words, o-5 can be described by a feature, whereas the context contains objects that do not have any response for sc-5, and thus no features can be constructed for the context:

a-5: o-5<->{o-9 o-1}

| | |
|---|---|
| Topic: ((sc-5-2 v-1)) | [Feature (sc-5-2 v-1) applies to topic] |
| Context: (NIL NIL) | [No features found for the context] |
| Success: ((sc-5-2 v-1)) | [(sc-5-2 v-1) is a distinctive feature] |

The next game seeks to distinguish o-6 (topic) from o-2 and o-5 (which, jointly, form the context). This game is also successful because o-6 has value v-0 for sc-5-2, o-2 has nothing and o-5 has v-1.

a-5: o-6<->{o-2 o-5}
Topic: ((sc-5-2 v-0))
Context: (NIL ((sc-5-2 v-1)))
Success: ((sc-5-2 v-0)) [(sc-5-2 v-0) is a distinctive feature]

Further discrimination games follow, during which a new attribute sc-1-2 is introduced. In the following game it is sought to distinguish o-7 (topic) from o-1 and o-2 (context). In this case, the features are not sufficiently distinctive and therefore a new attribute (and, thus, feature) is created. As long as there are possibilities to focus on additional data channels, existing features will not be refined. The new attribute is defined on sc-3, a data channel on which data is observed for the topic o-7.

a-5: o-7<->{o-1 o-2}
Topic: ((sc-1-2 v-1))
Context: (NIL ((sc-1-2 v-1)))
No distinctive features but new one possible, candidate channels=sc-2, sc-3 or sc-8.
New attribute sc-3-2

When all of the data channels have been covered, more refined feature detectors for existing attributes start to be made. For example, the attribute defined over sc-5 could be refined by defining a new attribute sc-5-$2_0$-2, being the division of the subregion corresponding to feature (sc-5-2 v-0) into two smaller subregions of equal size with corresponding features (sc-5-$2_0$-2 v-0)(sc-5-$2_0$-2 v-1).

After a sufficient number of discrimination games the set of features stabilises. For the set of objects given above, the following is a stable discrimination tree. For each attribute the possible values are listed with their corresponding regions indicated in square brackets and followed by the number of times the feature in question has been used for discrimination of a topic from its context during the current series of discrimination games.

sc-5-2:
   v-0: [0.00 0.50] 358.
      sc-5-$2_0$-2:
         v-0: [0.00 0.25] 31.
            sc-5-$2_0$-$2_0$-2:
               v-0: [0.00 0.12]
                  sc-5-$2_0$-$2_0$-$2_0$-2
                     v-0: [0.00 0.06]; v-1: [0.06 0.12] 3.
               v-1: [0.120.25]
         v-1: [0.25 0.50] 22.
   v-1: [0.50 1.00] 309.
sc-1-2:
   v-0: [0.00 0.50] 651; v-1: [0.50 1.00] 628.
sc-3-2:
   v-0: [0.000.50] 713; v-1: [0.50 1.00] 733.
sc-8-2:
   v-0: [0.00 0.50] 15; v-1: [0.50 1.00] 8.
sc-2-2:
   v-0: [0.000.50]99; v-1: [0.50 1.00] 112.
sc-0-2:

v-0: [0.00 0.50]; v-1: [0.50 1.00] 42.
sc-4-2:
   v-0: [0.00 0.50] 223.
      sc-4-$2_0$-2:
         v-0: [0.00 0.25]
         v-1: [0.25 0.50] 1.
            sc-4-$2_0$-$2_1$-2:
               v-0: [0.25 0.37] 5; v-1: [0.37 0.50] 5.
   v-1: [0.50 1.00] 215.
      sc-4-$2_1$-2:
         v-0: [0.50 0.75] 1.
         v-1: [0.75 1.00] 2.
            sc-4-$2_1$-$2_1$-2:
               v-0: [0.75 0.87] 5; v-1: [0.87 1.00] 2.
sc-6-2:
   v-0: [0.00 0.50] 2; v-1: [0.50 1.00].

We see that more abstract features, like (sc-1-2 v-0), are used more often. For some, like (sc-5-2 v-0), there is a deep further discrimination. For others, like (sc-5-2 v-1), there is none. Some features, like (sc-6-2 v-1), have not been used at all and could therefore be eliminated. Another experiment with the same objects but for a different agent a-6 yields a different discrimination tree. In one example, some sensory channels (such as sc-6) were not used, sc-4 was no longer refined, etc. Usually, there are indeed many different possibilities.

When new objects enter an environment, it is preferable that the agent attempting to characterise objects in that environment should construct new distinctions if they are necessary. This is effectively what happens in preferred embodiments of the present invention. If new sensory channels become available, for example, because a new sensory routine has become active, then they will be exploited if the need arises. Obviously, if a new object entering the agent's field of attention can already be discriminated from all of the other objects, on the basis of features in the existing repertoire, the agent will not create any new features.

In the above-described preferred embodiment of the feature-extraction method, features are identified by ascribing to data points values indicating the sub-range of the data channel in which the data point falls; however, alternative approaches are possible. For example, a feature detector could define one or more landmark values (e.g. $v_1$=−0.32, $v_2$=+0.64) within the range covered by a data channel (e.g. sc-1) and a "feature" could then consist in the identification of which is the landmark value closest to the data point (e.g. for a data point=+0.01, the feature would be (sc-1 v1) in this example), or in an identification not only of the closest landmark value but also of the separation between it and the data point. In such a case, "refinement" of the feature would consist in the definition of new landmark values within the range of the data channel. Moreover, in applications where time constraints are not critical, the choice of new landmark values could be based upon an analysis of the data points observed on the data channel in question in order to maximise the discriminatory potential of the resultant features.

Apparatus

The general features of a preferred embodiment of apparatus for putting the above-described feature extraction method into practice will now be described with reference to FIGS. 5 and 6.

Figure 5:
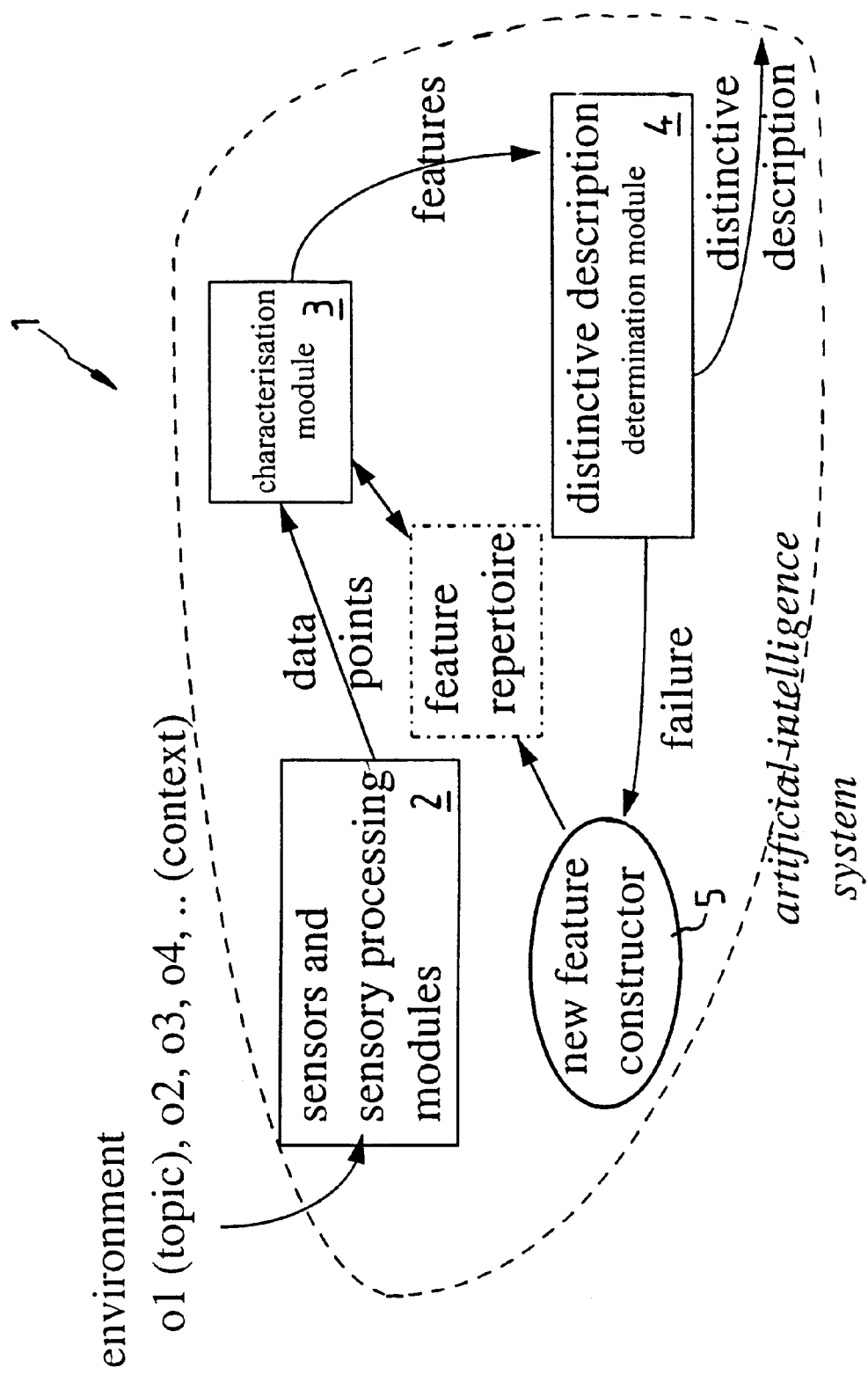
FIG. 5 is a block diagram indicating the modules present in an artificial intelligence system embodying the preferred embodiment of feature extraction apparatus according to the invention.
Figure 6:
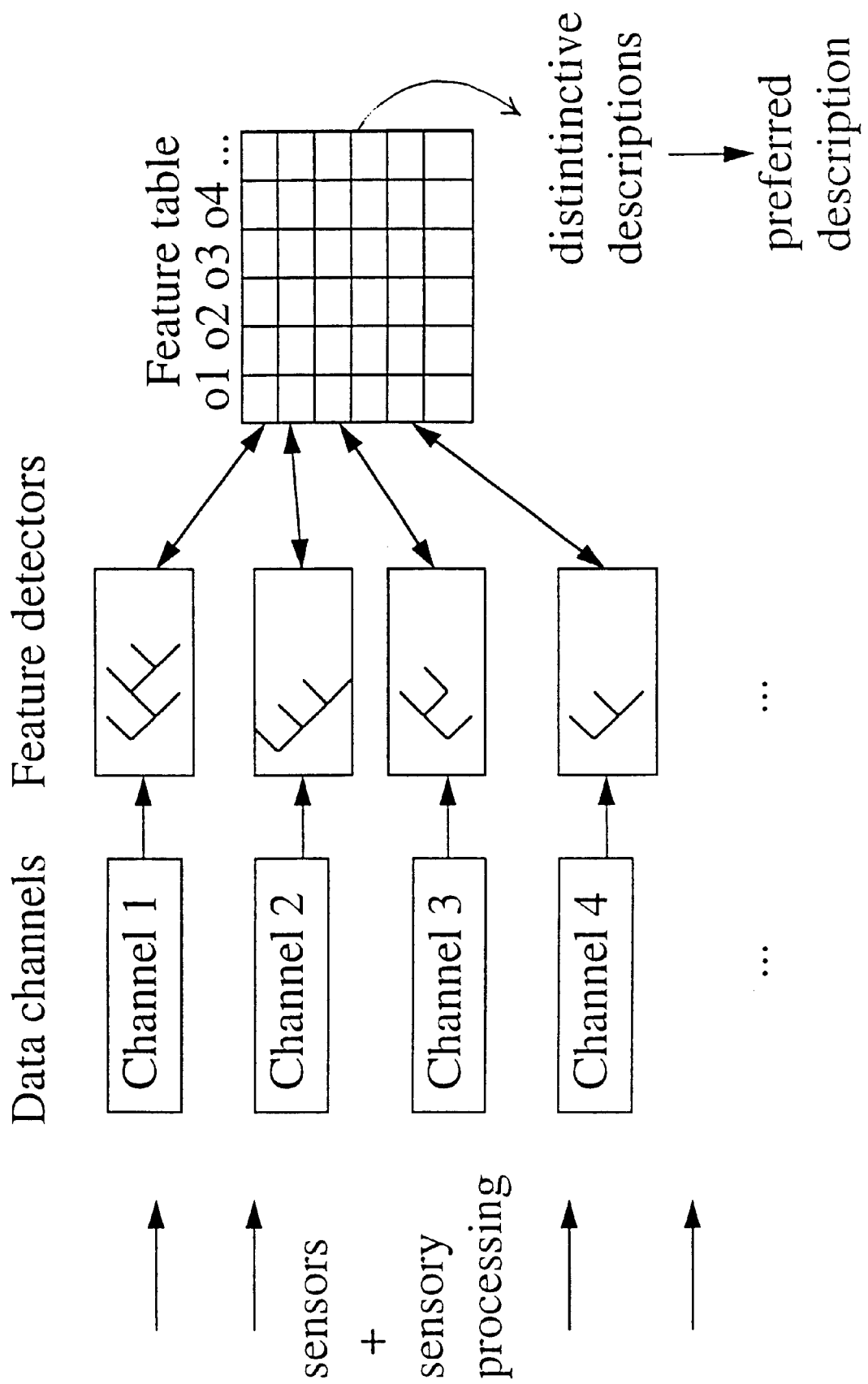
FIG. 6 is a diagram indicating the data structures and operators used by the artificial intelligence system of FIG. 5.

FIG. 5 illustrates the major components of an artificial intelligence system 1 constituting a preferred embodiment of apparatus according to the invention, whereas FIG. 6 illustrates the main operators and data structures used by this artificial intelligence system.

As shown in FIG. 5, the artificial intelligence system 1 is linked to or incorporates physical sensors and/or sensory processing modules 2 which detect properties of objects (or, more generally characteristics of entities which can include objects, situations, internal states of a machine, etc.). The sensors may take a wide variety of forms depending upon the chosen application. Non-limiting examples of typical sensors include imaging devices and sensors of physical properties such as temperature, voltage, pressure, etc.

The sensors or sensory processing modules 2 detect characteristics of entities o1, o2, etc. in the environment within the field of attention of the apparatus and generate data points for these entities in a plurality of data channels. Depending upon the application, the sensors may be pre-programmed or regulated to capture properties of particular entities o1, o2, etc. in the environment which will constitute the topic and the context mentioned above. Alternatively, the relevant entities can be identified in a dynamic fashion by an associated processing unit (not shown) applying known techniques, such as conventional object recognition algorithms, to signals detected by the sensors.

The data points generated by the sensors or sensory processing modules are fed to a characterisation module 3 which is adapted to apply feature detectors to the data points in order to determine the set of features which characterise the (current) topic and the set of features which characterise the entities (currently) making up the context. Information on the features identified by the characterisation module 3 is fed to a distinctive description determination module 4.

The operation of the characterisation module 3 and distinctive description determination module 4 is cyclical; successive "discrimination games" being performed as described above. Preferably, in each discrimination game the characterisation module 3 and distinctive description determination module 4 seek merely to discriminate the current topic from the current entities making up the context, rather than seeking to discriminate all objects in the context from one another. By changing the topic and/or context in different discrimination games, all of the objects in the environment will eventually be discriminated from each other. This approach is preferred because it drastically speeds up the processing of a single case, thus enabling quasi-real time treatment of cases.

In each discrimination game, the characterisation module 3 registers in a "feature table" the features determined for each of the current entities (topic and context), see FIG. 6. As the series of discrimination games progresses, and the feature repertoire is extended, new features may be found for an entity already covered by the feature table, in which case, the feature table is updated to include the new feature(s) in addition to the existing features. In this way, successive refinements of the features identified for a given entity will be listed in the feature table. Preferably, the feature table associates with each listed feature an indication of its "depth" in the hierarchy of the corresponding discrimination tree. Thus, the feature table indicates which features are more abstract (and hence represent a general, rather than a very specific, description of the entity).

The features determined by the characterisation module 3 during a particular discrimination game are also communicated to the distinctive description determination module 4 which compares the features of the "current" topic and context in order to determine whether any distinctive feature sets exist. If at least one distinctive feature set does exist then the distinctive description determination module 4 outputs information identifying this set or these sets of features. In a case where several distinctive feature sets exist, a further selection module (not shown) selects a preferred description of the current topic, based on selection criteria discussed above (e.g. the number of features in the set, the level of abstraction of the features in the set, the frequency of use of the features in the set, etc.).

In a case where the distinctive description determination module 4 cannot find a distinctive feature set, it outputs a signal indicative of "failure" to an associated new feature constructor 5. The new feature constructor 5 either segments a hitherto unsegmented channel or refines an existing data channel, thus enriching the feature repertoire useable by the characterisation module 3 in subsequent discrimination games.

In preferred embodiments of the apparatus, the distinctive description determination module 4 is adapted to create and maintain a "discrimination table" for use in determining the distinctive feature set(s). In this discrimination table, it is recorded, for each feature, which entities can be distinguished on the basis of this feature. It is also recorded, for each entity, by which feature it can be distinguished from the topic. By consulting this table, the distinctive description determination module 4 can determine which features of the topic enable each entity in the context to be eliminated (that is, enable the topic to be differentiated from this entity).

A count is maintained (either in the feature table or in the discrimination table) of the frequency with which a given feature forms part of distinctive feature sets ("use"). An indication is also kept of how often the feature formed part of a distinctive feature set which was selected as the preferred description of the topic ("success"). These parameters enable the most useful features to be identified and employed preferentially.

It is to be understood that the various modules of the system illustrated in FIG. 5 will often consist of software routines for running by a general purpose computer, although they could be integrated in dedicated hardware. The design of the necessary software routines is a matter of standard programming given the above explanation of the functions to be performed thereby.

The above-described apparatus may be supplemented by additional components depending upon the intended application. For example, in a case where the apparatus forms part of a system for autonomous development of a communications protocol ("language"), and it is desired that the communication should be audible, there may be an associated sound-production device for articulating sounds representative of particular features.

Experimental Results

A number of experiments were performed to verify the ability of the feature extraction method and apparatus of the present invention to autonomously create a feature repertoire enabling different objects to be discriminated from one another. These experiments show that the method and apparatus of the invention can deal with new objects.

Fixed Set of Objects

Figure 7:
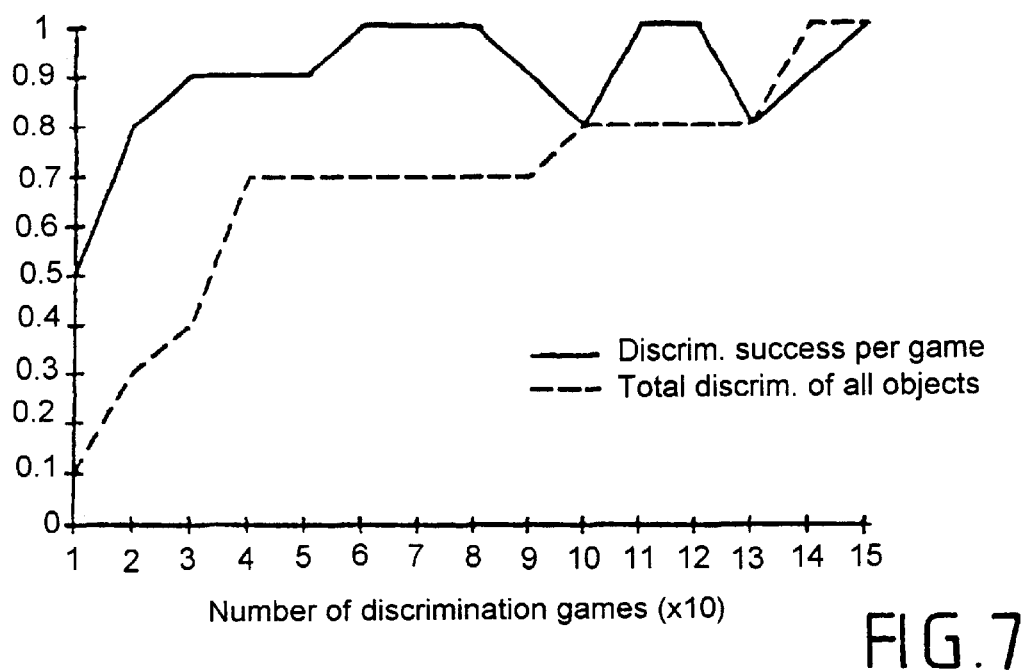
FIG. 7 is a graph indicating how success in discrimination games changes with the number of games played, in a case where the number of objects is fixed.

FIG. 7 is a graph illustrating how the discriminatory characteristics of a single agent evolve as the number of discrimination games played by the agent increases, in a case where the total number of objects is fixed. In this example, there are 10 objects and 5 data channels.

FIG. 7 shows a typical example where the agent builds up a repertoire of feature detectors starting from scratch. The graph shows the increasing discrimination success as experienced by the agent in the individual discrimination games (solid line). It also shows the global discrimination success achieved using the features so far, i.e. all objects are compared to all other objects only based on their features (dashed line). It can me seen that all objects can be discriminated after 150 discrimination games. Progress in finding more discriminatory features depends on encountering those objects that require more discrimination. Because context and topic are set probabilistically, this is not predictable.

Figure 8:
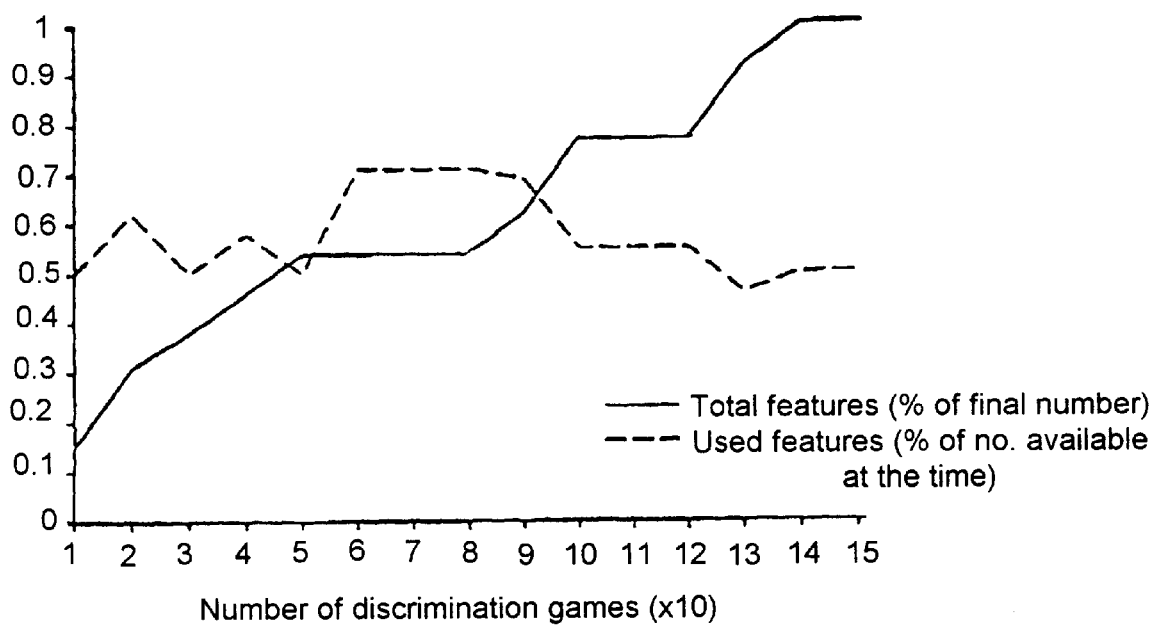
FIG. 8 is a graph indicating how the number of features used, and the percentage of features used out of the total available, changes with the number of discrimination games played, in a case where the number of objects is fixed.

The graph of FIG. 8 shows, for the same experiment, the increasing number of features (as a percentage of the final total (22) of features reached at the end of the experiment), and the percentage of features that is effectively used at any given time. We see that many features created earlier on are only gradually used and that there are still many cases that have not been encountered.

Increasing the Set of Objects

In the next experiment (FIG. 9), we start from a set of 10 objects and gradually add new objects in a probabilistic fashion, to reach a total of 50 objects. The average discrimination success in the individual discrimination games (solid line) remains close to the maximum (1.0) because new objects are only encountered occasionally and the feature detectors already constructed are general.

Figure 9:
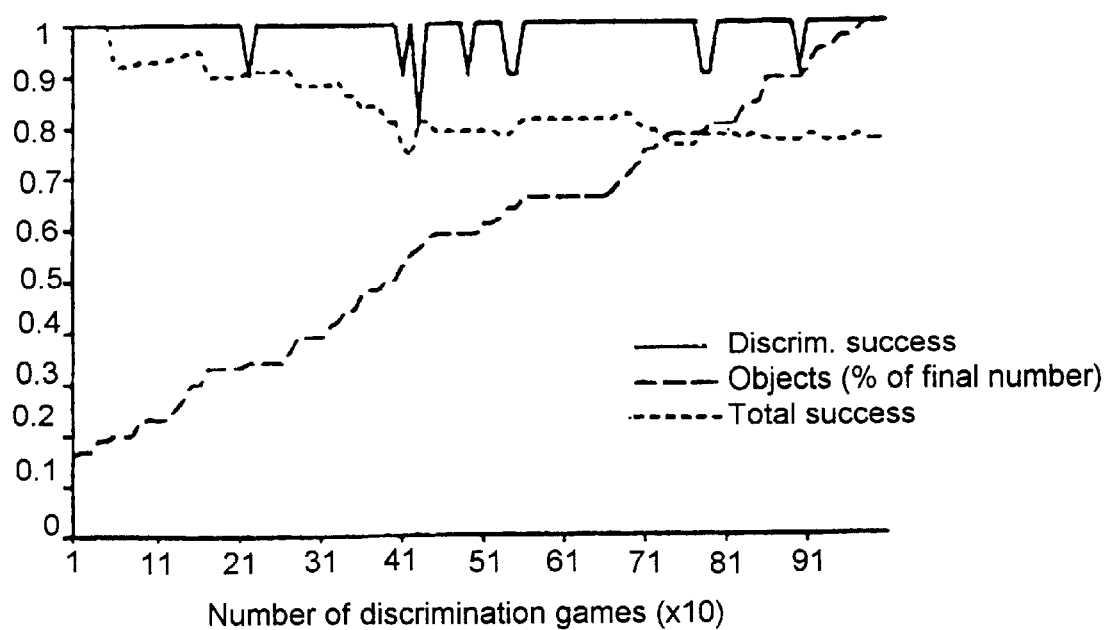
FIG. 9 is a graph indicating how success in discrimination games, and the number of features used, changes with the number of games played, in a case where the number of objects increases.

FIG. 9 also shows the total success with the features so far (line indicated by short dashes in FIG. 9), i.e. all objects are compared to all other objects and it is calculated which percentage can be distinguished from one another at the present time. This measure of "total success" is not as high as the "average success" in discrimination games because, in view of the fact that the number of objects is increasing, at each time point not all of the objects present have yet been involved in the series of discrimination games. This measure of "total success" can, however, be useful in evaluating the ability of different embodiments of the present invention to cope with the introduction of new objects into the environment of interest.

Figure 10:
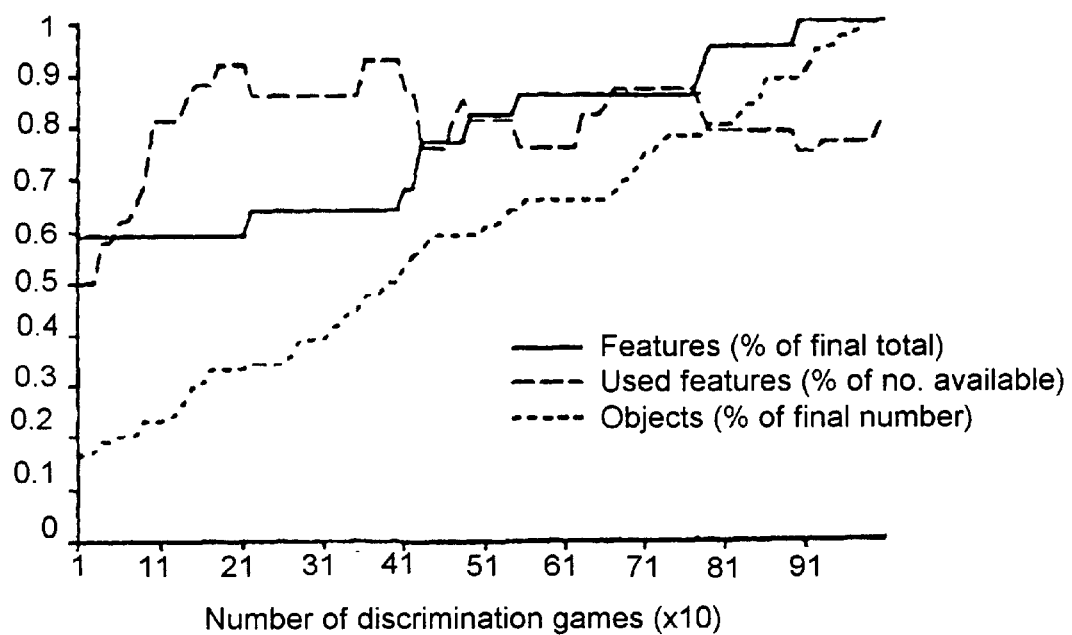
FIG. 10 is a graph indicating how the total feature repertoire, and the percentage used out of the total repertoire, changes with the number of discrimination games played, in a case where the number of objects increases.

FIG. 10 shows, for the same experiment, the relation between the total number of features that are available (solid line) and the features that are used (dashed line). We see that the feature repertoire is extended occasionally. Initially, not many new features are introduced but the available repertoire is used better. Later on new features are indeed necessary in order to cater for diversity introduced by the newly-introduced objects. We see also that the available repertoire of features is used much more extensively at the beginning clearly showing that, after a large number of discrimination games, certain features in the repertoire will be redundant or little-used. Such features can be eliminated from the feature repertoire in order to optimise usage of the available space in memory.

Conclusions

The present invention provides a mechanism for the creation of perceptually grounded meaning giving a set of sensory channels and a series of objects among which discrimination has to take place. The mechanism is based on selectionist principles. There is a generator of variety and selection pressure coming from success or failure in discrimination. It has been shown that the system arrives quite rapidly at a set of possible features for discriminating objects. Most interestingly, the system remains adaptive when new objects are added or when new sensory channels become available.

The present invention provides a method for extracting features which characterised objects, and has been explained in general terms. However, it is to be understood that numerous concrete applications are possible. In typical applications, the "agent" seeking to characterise objects is a robot or a computer-based system. Also, in general, the sensory channels may be linked, for example, to sensors of physical parameters, such as to visual, auditory, or internal sensors.

The feature extraction method of the present invention provides, in effect, a means of automatically determining a set of rules which characterise a particular object and permit the object to be discriminated from the context in which the object is placed (usually, a set of objects). This characterisation can be used for a wide variety of purposes. For example, in a case where the "agent" is a robot which needs to navigate in a space which may contain other moving objects, the ability to characterise objects enables the robot to detect and track individual objects, even those of a kind not previously known to the robot, with a view, for example, to avoiding collisions.

Many applications can be envisaged where the feature extraction method of the present invention is applied as a preliminary step and then, in subsequent operation, the robot or computer system concerned sorts objects (either ones used in the original feature extraction process or new objects coming into the field of attention of the robot/system) into different groups by making use of the characterisation thus obtained. Furthermore, preferably, the characterisation is refined, as a dynamic process, as new objects enter the field of attention of the robot/computer system.

In some applications, it may be useful to send an unmanned vehicle into a hostile environment and command a computer system on-board the vehicle to put into practice the feature extraction method of the invention and to broadcast details of the best feature discriminating set that has been found. The feature discriminating set can be analysed in order to determine what different types of objects can be distinguished by the computer system on-board the vehicle. Should it be desired to remove certain types of object from the hostile environment, or to perform some special type of operation on such types of object, then an instruction identifying such types of object in terms of features which have a meaning for the computer system on-board the remote vehicle can be transmitted to that computer system.

Numerous other applications are possible, where the feature extraction method of the present invention is used automatically to identify individual members of some population and, thus, to enable gathered information to be correctly attributed to the different individual entities. This can be a powerful technique for gathering experimental data, especially in remote or hostile environments.

This feature extraction of the present invention is performed automatically and dynamically and so, as mentioned above, is particularly suited for application by devices which need to operate autonomously or semi-autonomously.

Many further concrete applications of the method and apparatus according to the present invention will occur to the skilled person.

Example Application—Autonomous "language" Development

Experiments have been performed to demonstrate that the feature extraction method and apparatus of the present invention can be applied in a system where non-human agents co-operate in order to develop a "common language" or, at the very least, a "shared vocabulary" of expressions that can be used for describing objects or entities within their field of attention.

These experiments involved the use of two robotic heads each bearing an imaging device and connected to a respective control unit and data processing unit. The location of each robotic head was fixed but the orientation thereof was moveable with two degrees of freedom so that the direction of viewing of the respective imaging device could be altered (in these experiments, the focal distance of the imaging devices remained constant). The robotic heads were arranged so as that their imaging devices viewed a common environment containing a limited number of objects, and the control unit of each head was programmed to control the associated data processing unit to identify as an "object" any moving entity in the environment and any entity which stood out against the background. In order to ensure that both robotic heads viewed substantially the same scene at substantially the same moment, each robotic head was programmed to track a common reference object which moved within the common environment. Moreover, a timing unit supplied common timing signals to the data processing units for the two heads, so as to ensure that they both shared a common time frame of reference.

During these experiments, a first one of the robotic heads was designated the "speaker" whereas the other robotic head was designated the "listener". The pair of robotic heads performed a synchronised series of discrimination games in the manner described above. The data channels involved in the feature-extraction process related to the relationship between the robotic head and the viewed object (e.g. "angle of head", "estimated distance to object", etc.) and visual properties of the objects within the common environment (e.g. "object size", "object speed", "direction of movement of object", "object average grey level", etc.), derived by processing the image data produced by the respective imaging devices during the time period of the discrimination game and by processing signals from the mechanical elements serving to position the robotic head. In order to derive the data points in the various data channels, the data processing units associated with each robotic head made use of standard object recognition and image processing techniques.

At the end of each discrimination game, the "speaker" output a signal indicative of the result it had obtained in the discrimination game. This signal would indicate either FAILURE or, in the case of success, the "best" distinctive feature set determined by it during the discrimination game in question. The "listener" has no a priori information enabling it to determine precisely what is signified by the signal output by the "speaker" but, having also performed a discrimination game on a scene very similar to that viewed by the "speaker" (certain differences arising due to different perspectives of the two robotic heads) the "listener" may have obtained the same or a similar result in the discrimination game. In any event, the "listener" stored in its distinction table the features forming the "best" distinctive feature set according to its own estimation, together with an indication of the signal received from the "speaker". By building up stored information in this way during a series of discrimination games, the "listener" develops a dictionary indicating the likely meaning of different signals output by the "speaker".

The "listener" does not necessarily obtain precisely the same result as the "speaker" in each discrimination game. In particular, the feature repertoire of the "listener" may not be identical to that of the speaker at any given time (the "listener" may not yet have refined a data channel which has already been refined by the "speaker"). Moreover, since distinctive feature sets can include a plurality of features, the "listener" cannot initially establish an unambiguous relationship between a single received signal and an individual feature. However, by recording how often a particular signal is received from the "speaker" when the "listener" has identified a particular feature as forming part of the distinctive feature set, the "listener" builds up a numerical indication of the probability that a particular received signal corresponds to a particular feature and, inversely, builds up an indication of the most probable feature signified by a particular signal.

Further, in embodiments of the invention where an agent $a_i$ acts sometimes as a "speaker" and sometimes as a "listener", the probability linking a particular feature to a particular received signal can be determined based not only on how often a particular signal has been received from another agent when agent $a_i$ acting as "listener" has identified a particular feature as forming part of the distinctive feature set but also on how often agent ai has been successful in using the particular signal when agent ai acts as a "speaker" (the notion of "success" is explained below).

As an example, consider the case where agent 1 identifies feature v5 as a distinctive feature set and outputs a signal "nnnn" to represent this finding. Agent 2 may have identified feature v6 as the distinctive feature set in the same discrimination game and, thus, agent 2 will record amongst the possible meanings of "nnnn" the feature v6, rather than the correct feature v5. However, in some subsequent discrimination games, agent 2 will receive the signal "nnnn" at a time when it has identified v5 as the distinctive feature 10 set (or a component thereof) and so it will modify its record of possible meanings of the signal "nnnn" so as to include both v6 and v5. By recording the number of times during the series of discrimination games that "nnnn" is deemed to be associated with v6 and the number of times it is deemed to be associated with v5, agent 2 will gradually determine that the likelihood is greater that "nnnn" corresponds to v5 after all.

In the above experiments, the duration of the individual discrimination games was gradually increased (in synchronism for the two agents), so as to build up the complexity of the system and, thus, the complexity of the expressions exchanged by the agents.

In a preferred arrangement, for each feature in its repertoire the agent keeps a record of the number of times the feature forms part of a distinctive feature set ("use" of the feature) and a record of the number of times the feature is described in an output signal ("success" of the feature since it has been used for communication). The evaluation of "use" and "success" of the different features can lead to selectionist pressure on data channels and future rejection, from the computations, of data channels which, in practice, never contribute to the communication process.

In order to maximise the flexibility of the system, that is the ability thereof to adapt to new situations, the different agents preferably are not programmed so as to select identical channels for refinement at the same stage in the series of discrimination games. By recording the "use" and "success" of the different features, and preferentially employing features which have been successful in the past, the agents nevertheless converge in a reasonably short period of time on a common set of expressions for representing respective particular features.

As the number of discrimination games increases in an environment including a limited set of objects, it has been found that the probabilities established by the "listener" tend to indicate more and more accurately the correct correspondence between the received signals (and, thus, the features they represent for the "speaker") and the features perceived by the "listener". In other words, the "speaker" and "listener" develop the same correlation between particular expressions and particular perceived features. This common vocabulary can be used in communications between the agents, for example to enable them to work together to achieve a common goal.

Moreover, experiments have been conducted in environments where the number of objects increases, where new agents are introduced and/or existing agents are eliminated. In all of these cases it has been found that a common vocabulary can be built up between the agents provided that, in the case of introduction of new agents/elimination of existing agents, the turnover of agents is not too rapid. Interestingly, simulations involving large numbers of physically-separated agents show a tendency for different "dialects" to develop in the communities of agents which are physically remote from one another.

In the case where the feature extraction method of the present invention is used in a system for the autonomous development of a communications protocol or "language" between agents, it is possible to encourage the build-up of a common vocabulary including expressions whose respective meanings are as general as possible. This can be done by programming the agents to perform the discrimination games in such a way that, when it is necessary to refine a discrimination tree, a preferential choice is made of those discrimination trees which are relatively undeveloped. This ensures that the most general features possible are developed.

However, in the context of such language-development systems, it can sometimes be preferable to encourage the build-up of "specialist vocabulary", by preferentially refining particular data channels to a very great degree whilst leaving certain other data channels relatively undeveloped. In this context, it is interesting to note that the location of a feature at a deeper or shallower level in the hierarchy defined by the discrimination tree corresponds to different "registers" of language. A first agent seeking to describe an object to a second agent may thus select appropriate descriptive features from a level of the respective discrimination tree which is adapted to the degree of specialisation of vocabulary ("linguistic ability") of the second agent. (Obviously, in the latter case, the first agent must receive or deduce information indicating the degree of specialisation of the vocabulary of the second agent).

The signals output by the "speaker" to the "listener" can take any one of a large number of forms including but not limited to electrical signals exchanged via a wire or wireless link, audio or visual signals detectable by suitable detectors associated with the "listener", etc. Moreover, the transmitted signals can be presented in a wide variety of different formats. For example, in order to simplify processing by the "listener", the signal output by the listener at the end of an individual discrimination game may take the form of a frame of predefined structure in which component signals representing different features can be distinguished from one another (by virtue of their location within the overall frame, or by virtue of a pre-programmed symbol indicating the separation between adjacent "features", etc.).

The experimental set-up described above can form the basis of systems adapted autonomously to develop a common vocabulary between two, or more, non-human agents. Moreover, the same general approach can be followed in order to develop a communications interface between a human user and a non-human agent (in which case, the human user will normally constitute the "speaker" and the non-human agent will constitute the "listener"). Numerous modifications of the described approach can be made when such systems are implemented.

For example, rather than one agent always constituting the "speaker" and another the "listener", the agents can take turns to propose signals describing the result of the discrimination games, or both agents in turn can make a proposal of a signal describing the same discrimination game. In such a case, each speaker can attempt to make use of the "common vocabulary" in its current state of development, by selecting for output the signal which it currently considers to have the highest probability of corresponding to the distinctive feature set which it wishes to describe. It has been found that again in this case the different agents gradually do develop a common set of expressions for describing particular perceived features.

Moreover, in the experiments described above, it was ensured that the agents both attempted to characterise the same topic by pre-programming the robotic heads to track a common object; however, other techniques can be used. For example, the "speaker" can be provided with means, such as a visual or mechanical pointer, for indicating to the "listener" which topic it is seeking to characterise. In such a case, the "speaker" points at (or otherwise indicates) the topic and outputs a signal descriptive thereof, whereas the "listener" observes the scene indicated by the "speaker", makes a determination of what is the topic, attempts to find its own description for this topic and correlates its own description with the received signal.

Experimental Results

Figure 11:
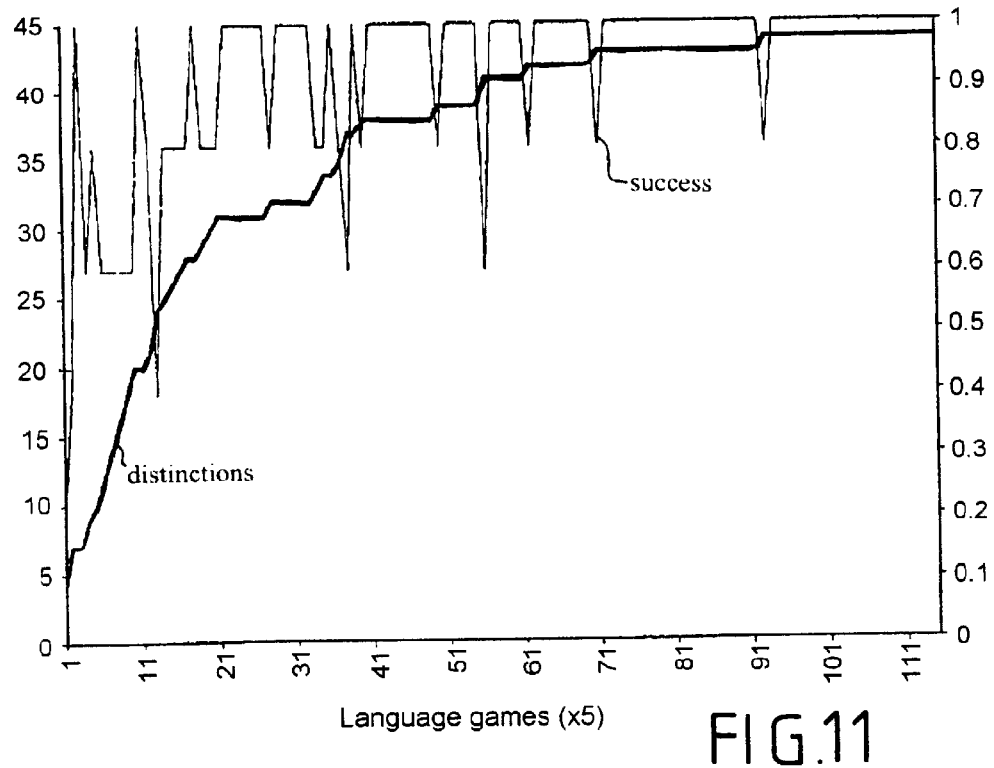
FIG. 11 is a graph indicating how the discrimination ability of an agent involved in the development of a communications protocol changes during a series of discrimination games.
Figure 12:
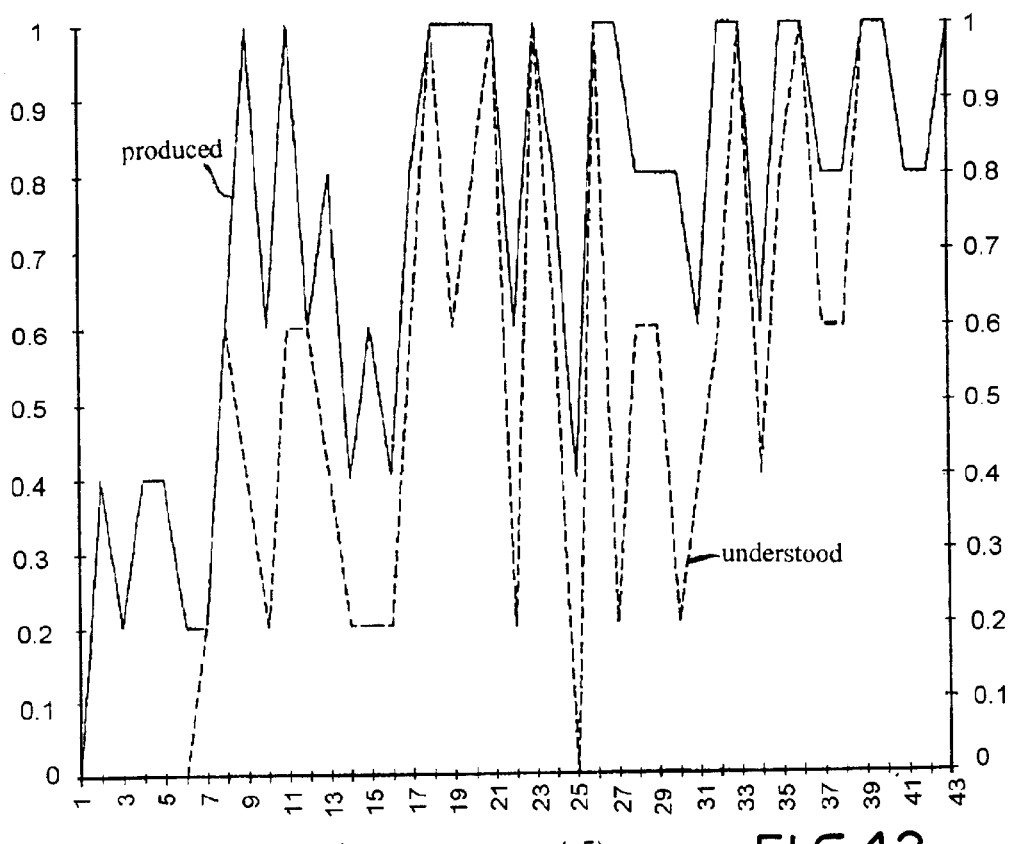
FIG. 12 is a graph indicating how the lexicon of the agent of FIG. 11 develops during a series of discrimination games.

Experiments have been performed to verify the ability of agents in a multi-agent system to build up a common set of representations ("lexicon") to represent particular features, by making use of the techniques of the present invention. Results of one such experiment, involving a pair of agents observing a "real-world" environment, are illustrated in FIGS. 11 and 12. During this experiment, the number of objects in the field of attention of the agents was not fixed. Both FIGS. 11 and 12 illustrate the performance of an agent acting as "speaker". FIG. 11 illustrates the improving discriminatory ability of the agent as the series of discrimination games (here called "language games") progressed. FIG. 12 shows the improving ability of the agent to find consistent representations for particular features, and the increasing tendency for these representations to be correctly interpreted by the "listener" agent.

FIG. 11 shows how the number of "distinctions" recognised by the speaker developed as the series of language games progressed (see the thick line in FIG. 11). In this example, "distinctions" refer to refinements of discrimination trees which partition the data space into a pair of sub-regions, thus for each "distinction" there are two corresponding features in the feature repertoire. FIG. 11 also indicates (by the thin line in the figure) how the "success" in language games improved as the series of games progressed, in other words, that the agent became increasingly able to determine a distinctive feature set to describe selected topics.

FIG. 12 illustrates (by a solid line) how the ability of the agent to find representations to express the features describing a topic (distinctive feature set) improves during the series of language games. The dashed line illustrates the increasing agreement between the "speaker" and "listener" regarding which feature is signified by the representation output by the "speaker".

Although the present invention has been described above with reference to specific embodiments thereof, and a particular application thereof, it is to be understood that a wide variety of changes and adaptations may be made therein within the scope of the invention as defined in the appended claims.

What is claimed is:

1. A machine-implemented method employing artificial intelligence for extracting features characterising entities, the method comprising:
   discriminating an entity from a context, the step of discriminating including
   (a) determining the context consisting of at least two entities,
   (b) choosing a topic entity from the context,
   (c) ascribing to the topic entity, and to the other entities in the context, respective features applicable thereto taken from a feature repertoire,
   (d) judging whether, among the ascribed features, there is a set of features which differentiates the topic entity from the other entities in the context,
   (e) if the result of the judging step is negative, deriving a new feature and adding said new feature to the feature repertoire, and
   (f) if the result of the judging step is positive, registering the distinctive feature set, or one of the distinctive features sets if a plurality thereof exist, as an outcome.

2. A method according to claim 1, wherein the discrimination step is repeated with a different entity being chosen as the topic in step (b).

3. A method according to claim 1, wherein the discrimination step is restarted if the context contains any entity which has not yet been discriminated from the other entities in the context.

4. A method according to claim 1, wherein the entities are objects.

5. A method according to claim 4, wherein each feature of the feature is expressed in a pair of an attribute and a value.

6. A method according to claim 4, wherein each feature in the feature repertoire is derived by a feature detector ascribing one or more values to the output range of a first data channel.

7. A method according to claim 6, wherein the step of deriving a new feature comprises:
   creating a new feature detector ascribing one or more values to the output range of a data channel, different from the first data channel, for which no feature detector has yet been created.

8. A method according to claim 6, wherein the step of deriving a new feature comprises:
   modifying a feature detector so as to increase the number of values ascribed thereby to the output range of the corresponding data channel.

9. A method according to claim 1, and comprising the step of counting the number of times each feature of the feature repertoire forms part of a distinctive feature set.

10. A method according to claim 1, wherein the step of registering comprises:
    judging whether there exists a smallest distinctive feature set; and
    if there is a smallest distinctive feature set, registering said smallest distinctive feature set as the outcome.

11. A method according to claim 10, wherein the step of registering comprises:
    if there is no smallest distinctive feature set, judging whether there is a distinctive feature set corresponding to the smallest number of segmentations of data channels; and if there is a distinctive feature set corresponding to the smallest number of segmentations of data channels, registering this distinctive feature set corresponding to the smallest number of segmentations as the outcome.

12. A method according to claim 11, wherein the step of registering comprises:
if there is no distinctive feature set corresponding to the smallest number of segmentations of data channels, registering as the outcome the feature set which has been used most often.

13. Artificial intelligence apparatus extracting features characterising entities, the apparatus comprising:
means for receiving information on entities in the field of attention of the apparatus, via one or more data channels;
means for determining within the field of attention of the apparatus a context consisting of at least two entities,
selection means for choosing a topic entity from the context,
means for applying one or more feature detectors to the information received by the receiving means during a time period, whereby to ascribe to the topic entity, and to the other entities in the context, respective features applicable thereto taken from a feature repertoire,
judging means for determining whether, among the ascribed features, there is a set of features which differentiates the topic entity from the other entities in the context,
new feature creation means adapted, if the result of the judging step is negative, to define a new feature and add said new feature to the feature repertoire, and
registration means adapted, if the result of the judging step is positive, to register the distinctive feature set, or one of the distinctive feature sets if a plurality thereof exist, as an outcome.

14. Apparatus according to claim 13, wherein the selection means is adapted to select different entities from the context as the topic entity.

15. Apparatus according to claim 14, wherein the selection means is adapted to select, as the topic entity, any entity which has not yet been discriminated from the other entities in the context.

16. Apparatus according to claim 13, wherein the or each feature detector is adapted to detect one or more features corresponding to values in the output range of a corresponding data channel.

17. Apparatus according to claim 16, wherein the new feature creation means is adapted to creating a new feature detector operative on a data channel for which no feature detector yet exists created.

18. Apparatus according to claim 16, wherein the new feature creation means is adapted to modify an existing feature detector so that the number of features detectable thereby increases whereby to correspond to an increased number of different values in the output range of the corresponding data channel.

19. Apparatus according to claim 13, and comprising counting means for counting the number of times each feature of the feature repertoire forms part of a distinctive feature set.

20. Apparatus according to claim 19, wherein the registration means is adapted to judge whether there exists a smallest distinctive feature set and, if there is a smallest distinctive feature set, to register said smallest distinctive feature set as the outcome.

21. Apparatus according to claim 20, wherein the registration means is adapted, if there is no smallest distinctive feature set, to judge whether there is a distinctive feature set corresponding to the smallest number of segmentations of data channels; and if there is a distinctive feature set corresponding to the smallest number of segmentations of data channels, to register this distinctive feature set corresponding to the smallest number of segmentations as the outcome.

22. Apparatus according to claim 21, wherein the registration means is adapted, if there is no distinctive feature set corresponding to the smallest number of segmentations of data channels, to register as the outcome the feature set which has been used most often.

23. An artificial intelligence multi-agent system in which the agents autonomously develop a common set of representations to identify a common set of features, wherein:
each of the agents in the system comprises apparatus according to claim 13,
the agents are adapted to seek to discriminate topic entities from a context during synchronised discrimination cycles during which a first agent operates in a first mode and at least one second agent operates in a second mode,
the agents are adapted, in the first mode, to generate and transmit to the other agent(s) respective representations identifying the distinctive feature sets registered by the registration means thereof during particular discrimination cycles; and
the agents are adapted, in the second mode, to record an association, or modify a recorded association, between the received representations and the distinctive feature sets registered by their own registration means during the respective corresponding discrimination cycles.

24. A multi-agent system according to claim 23, wherein the agents are adapted, in said first mode, to select for transmission a representation evaluated as having the greatest probability of leading to correct identification, by the other agent(s), of the corresponding feature(s).

25. A multi-agent system according to claim 23, wherein the agents are adapted to identify which representation identifies a particular feature by performing an evaluation including the step of determining which representation is received most often when said particular feature forms part of a distinctive feature set registered by the registration means of said agent operating in the second mode.

26. A multi-agent system according to claim 23, wherein the agents are adapted to identify which representation identifies a particular feature by performing an evaluation including the step of determining which representation has been transmitted thereby to the other agents most often to identify distinctive feature sets including said particular feature.

* * * * *